US008514699B2

(12) United States Patent
Kim et al.

(10) Patent No.: US 8,514,699 B2
(45) Date of Patent: Aug. 20, 2013

(54) APPARATUS AND METHOD FOR ADMISSION CONTROL CONSIDERING MULTIPLE SERVICE PROVIDERS IN A BROADBAND WIRELESS COMMUNICATION SYSTEM

(75) Inventors: Ki-Back Kim, Seongnam-si (KR);
Eun-Chan Park, Seongnam-si (KR);
Chang-Yeon Kim, Suwon-si (KR)

(73) Assignee: Samsung Electronics Co., Ltd.,
Suwon-si (KR)

( * ) Notice: Subject to any disclaimer, the term of this patent is extended or adjusted under 35 U.S.C. 154(b) by 726 days.

(21) Appl. No.: 12/326,533

(22) Filed: Dec. 2, 2008

(65) Prior Publication Data
US 2009/0154413 A1    Jun. 18, 2009

(30) Foreign Application Priority Data

Dec. 18, 2007  (KR) .................. 10-2007-0133796

(51) Int. Cl.
*H04L 12/26*    (2006.01)
(52) U.S. Cl.
USPC ........................... 370/230; 370/235; 370/465
(58) Field of Classification Search
USPC ........... 370/230, 230.1, 231, 235, 310, 395.2, 370/395.21, 395.4, 395.41–395.43, 437, 370/465, 468, 400–401
See application file for complete search history.

(56) References Cited

U.S. PATENT DOCUMENTS

| 6,125,397 | A  | * | 9/2000  | Yoshimura et al. ........... 709/235 |
| 7,570,587 | B1 | * | 8/2009  | Wilson et al. ................. 370/230 |
| 7,613,461 | B2 | * | 11/2009 | Inoko ............................ 455/450 |
| 7,738,891 | B2 | * | 6/2010  | Tenhunen et al. ............ 455/512 |
| 8,155,006 | B2 | * | 4/2012  | Liu et al. ....................... 370/235 |
| 2004/0218605 | A1 | * | 11/2004 | Gustafsson et al. ........ 370/395.2 |
| 2005/0260997 | A1 | * | 11/2005 | Korale et al. .............. 455/452.2 |
| 2006/0023675 | A1 | * | 2/2006  | Karaoguz et al. ............ 370/338 |
| 2006/0291489 | A1 | * | 12/2006 | Naqvi et al. .................. 370/401 |
| 2007/0195700 | A1 | * | 8/2007  | Katoh et al. .................. 370/235 |
| 2007/0206613 | A1 | * | 9/2007  | Silver et al. ................... 370/401 |
| 2008/0077426 | A1 | * | 3/2008  | Li et al. ........................... 705/1 |
| 2008/0133729 | A1 | * | 6/2008  | Fridman et al. .............. 709/223 |
| 2009/0279483 | A1 | * | 11/2009 | Falchuk et al. .............. 370/328 |
| 2010/0188975 | A1 | * | 7/2010  | Raleigh ..................... 370/230.1 |
| 2010/0189019 | A1 | * | 7/2010  | Belfort et al. ................. 370/310 |

FOREIGN PATENT DOCUMENTS

| JP | 2002-024192 A    | 1/2002 |
| KR | 10-2004-0110647 A | 12/2004 |
| KR | 10-2007-0119154 A | 12/2007 |
| KR | 10-2008-0027113 A | 3/2008 |

* cited by examiner

*Primary Examiner* — Kevin Mew
(74) *Attorney, Agent, or Firm* — Jefferson IP Law, LLP

(57) ABSTRACT

An apparatus and method for Admission Control (AC) in a broadband wireless communication system are provided. The apparatus includes a classification unit for determining a Mobile Virtual Network Operator (MVNO), from a plurality of MVNOs, that provides services for a generated resource request, a manager for evaluating a resource occupation status of the MVNO and a resource amount permitted to the MVNO, and a determination unit for determining whether to admit the resource request according to at least one of the resource occupation status of the determined MVNO, the resource amount permitted to the determined MVNO and an available total resource amount.

20 Claims, 3 Drawing Sheets

APPARATUS AND METHOD FOR ADMISSION CONTROL CONSIDERING MULTIPLE SERVICE PROVIDERS IN A BROADBAND WIRELESS COMMUNICATION SYSTEM

PRIORITY

This application claims the benefit under 35 U.S.C. §119 (a) of a Korean patent application filed in the Korean Intellectual Property Office on Dec. 18, 2007 and assigned Serial No. 10-2007-0133796, the entire disclosure of which is hereby incorporated by reference.

BACKGROUND OF THE INVENTION

1. Field of the Invention

The present invention relates to a broadband wireless communication system. More particularly, the present invention relates to an apparatus and method for Admission Control (AC) considering a plurality of service providers in a broadband wireless communication system.

2. Description of the Related Art

Voice services have been a primary concern in the development of wireless communication systems. As communication technologies have advanced, various multimedia and data services, in addition to the voice services, are becoming increasingly important. However, voice-based communication systems have failed to satisfy user demand for multimedia and data services due to a relatively small transmission bandwidth and expensive service fees. Moreover, the development of communication industries and the growing demand for Internet services have resulted in an increased need for a broadband wireless communication system capable of effectively providing the Internet services.

In general, the broadband wireless communication system is constructed by considering a single service provider and a single physical network. However, with the growing number of users who request various services and with a demand for improved quality of contents of services provided through the physical network, a plurality of service providers intend to provide services through the wireless communication system. The plurality of service providers are expected to share a single physical network. Since the physical network comprises limited resources, the sharing of the single physical network by different service providers may result in unequal use of resources.

Accordingly, there is a need for an apparatus and method for effectively distributing resources of a physical network (i.e., Access Service Network (ASN)) to a plurality of service providers.

SUMMARY OF THE INVENTION

An aspect of the present invention is to address at least the above-mentioned problems and/or disadvantages and to provide at least the advantages described below. Accordingly, an aspect of the present invention is to provide an apparatus and method for effectively distributing resources of an Access Service Network (ASN) to a plurality of service providers in a broadband wireless communication system.

Another aspect of the present invention is to provide an apparatus and method for Admission Control (AC) by considering a plurality of service providers in a broadband wireless communication system.

In accordance with an aspect of the present invention, an apparatus for AC in a broadband wireless communication system is provided. The apparatus includes a classification unit for determining a Mobile Virtual Network Operator (MVNO), from a plurality of MVNOs, that provides services for a generated resource request, a manager for evaluating a resource occupation status of the MVNO and a resource amount permitted to the MVNO, and a determination unit for determining whether to admit the resource request according to at least one of the resource occupation status of the determined MVNO, the resource amount permitted to the determined MVNO and an available total resource amount.

In accordance with another aspect of the present invention, a method for AC in a broadband wireless communication system is provided. The method includes determining an Mobile Virtual Network Operator (MVNO), from a plurality of MVNOs, that provides services for a generated resource request, evaluating a resource occupation status of the MVNO and a resource amount permitted to the MVNO, and determining whether to admit the resource request according to at least one of the resource occupation status of the determined MVNO, the resource amount permitted to the determined MVNO and an available total resource amount.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, an Admission Control (AC) technique considering a plurality of service providers in a broadband wireless communication system will be described. Herein, the term "AC" denotes a process of determining whether to admit a connection and a call which are requested based on user counting, Service Flow (SF) counting, a bandwidth for each SF, etc. In other words, the AC considered in exemplary embodiments of the present invention includes AC based on a user count, AC based on an SF count and Connection Admission Control (CAC) based on a bandwidth determination for each SF. The CAC based on the bandwidth determination is only for Quality of Service (QoS) SFs excluding Best Effort (BE) SFs. In case of the BE SFs, a usage rate can be limited when scheduling is performed at a maximum sustained traffic rate.

Figure 1:
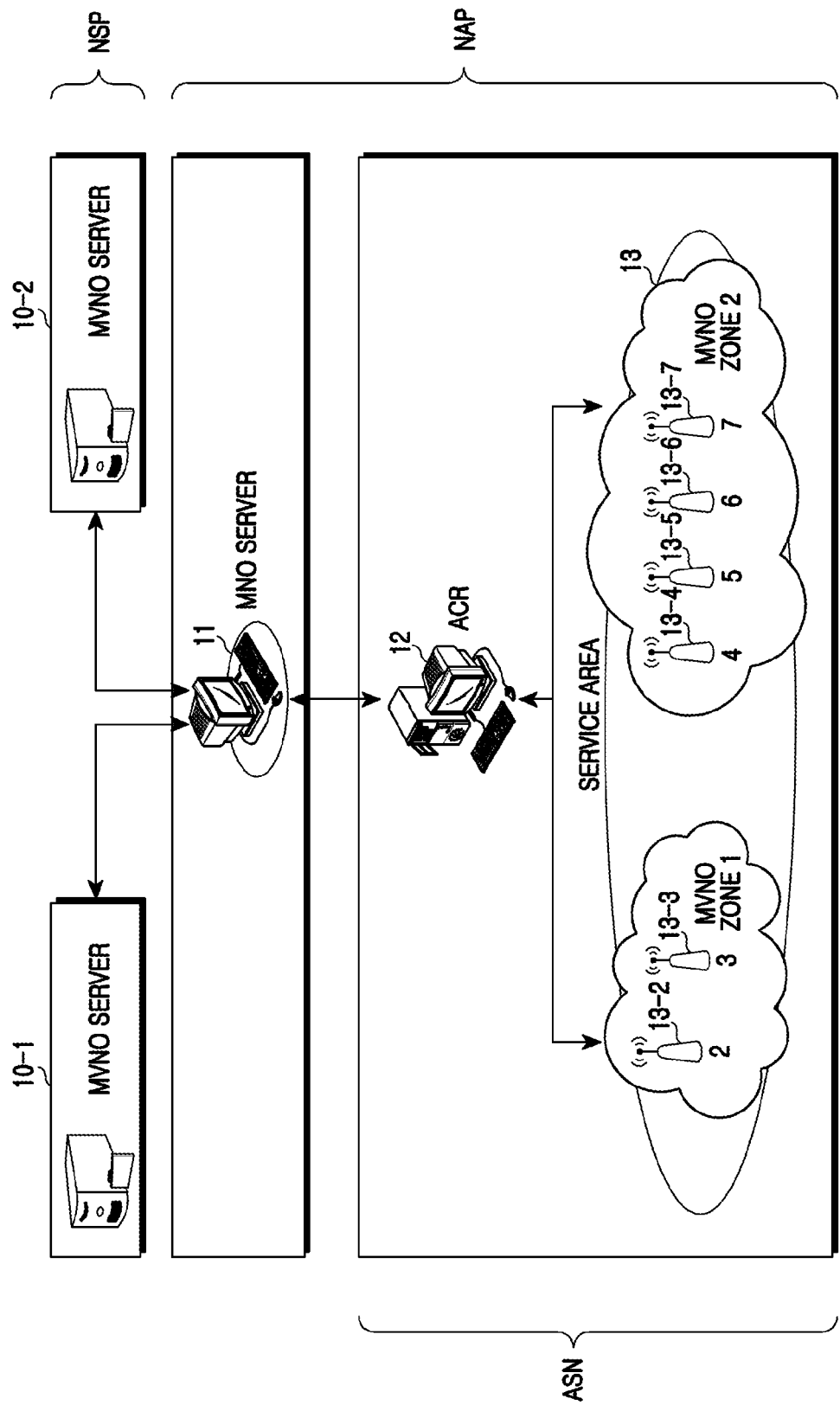
FIG. 1 is a schematic view illustrating a structure of a broadband wireless communication system according to an exemplary embodiment of the present invention.

FIG. 1 is a schematic view illustrating a structure of a broadband wireless communication system according to an exemplary embodiment of the present invention. In FIG. 1, Network Entities (NEs) are defined according to functions, and thus the NEs may be referred to as other terminologies depending on standard group's or operator's intention. For example, a Base Station (BS) may also be referred to as an Access Point (AP), a Radio Access Station (RAS), and a Node-B. In addition, a BS controller may also be referred to as a Radio Network Controller (RNC), a Base Station Controller (BSC), an Access Control Router (ACR), and an Access Service Network-Gateway (ASN-GW). The ASN-GW may also function as a router in addition to the BS controller, for example.

Referring to FIG. 1, the broadband wireless communication system comprises a structure including a Network Access Provider (NAP) region and a Network Service Provider (NSP) region. A BS 13, an ACR 12, and a Mobile Network Operator (MNO) server 11 belong to the NAP region. Mobile Virtual Network Operator (MVNO) servers 10-1 and 10-2 belong to the NSP region. The ACR 12 and the BS 13 also belong to an Access Service Network (ASN). Since the NAP and the ASN are not one-to-one related, a single NAP may include a plurality of ASNs. As functional entities, the MVNO servers 10-1 and 10-2 and the MNO server 11 may be provided as separate servers as shown in FIG. 1 or may be located within another network entity of a corresponding region (i.e., NSP or NAP). If the NSP and the NAP are identical, functions of the MVNO servers 10-1 and 10-2 and the MNO server 11 may be combined in a single network entity.

The MVNO servers 10-1 and 10-2 are located in the NSP region. The MVNO server 10 is a functional entity which may be provided by individual Service Providers (SPs). The MVNO servers 10-1 and 10-2 comprise an interface with an external contents server (not shown), a contents provider (not shown), and an Authentication, Authorization, Accounting (AAA) server (not shown). Further, the MVNO servers 10-1 and 10-2 perform a function for transmitting a service authorization key for each content to a Mobile Station (MS). The MNO server 11 is located in the NAP region. The MNO server 11 performs a function for providing an optimized service by comprehensively determining requirements of individual SPs and conditions of network entities included in the NAP.

The ACR 12 belongs to the ASN. The ACR 12 manages subscriber connection and mobility, and allocates a unique SF for uplink/downlink. Further, the ACR 12 comprises an interface with a Connectivity Serving Network (CSN) such as the AAA server. Since the MVNO servers 10-1 and 10-2 trigger the contents server or the contents provider, the contents provider may transmit contents directly to the MNO server 11, and the contents may be provided from the MNO server 11 to the ACR 12. The BS 13 comprises a radio interface with the MS, and transmits traffic, which is received from the ACR 12, to the MS through a radio channel.

Although not shown, a policy server, an AAA server, a network management server, etc., may also be provided. The AAA server manages authentication and accounting information. The AAA sever may include a Subscription Profile Repository (SPR) function for managing profile information of each subscriber. Further, the AAA server may manage broadcast service authorization information for each subscriber, a security key obtained in initial authentication, and a security key lifetime. The network management server provides maintenance of network entities belonging to the ASN and performs a function for delivering information required to operate and initialize each network entity. The network management server may also be referred to as a Wibro System Manager (WSM) or an Element Management System (EMS). The policy server is a network entity for enforcing a service provider's policy and provides QoS requirements for each MS or SF to the ASN.

When a plurality of MVNOs share a single ASN, limited resources of the ASN must be properly distributed to each MVNO. In an exemplary embodiment of the present invention, the following criteria are considered in the distributing of ASN resources.

First, user count must be taken into consideration. For example, a maximum number of admitted users must be considered according to a user class and a network entry. The network entry may be classified into an initial network entry, a re-entry and a handover entry. In addition, the maximum number of admitted users is considered for all modes (i.e., an awake mode, a sleep mode and an idle mode).

Second, SF count is taken into consideration. In this case, the number of SFs is considered according to a sub-cell, a user class, a QoS type and a network entry. The network entry may be classified into an initial network entry, a re-entry and a handover entry.

Third, a bandwidth is taken into consideration. In this case, the bandwidth is considered according to a user class, a QoS type, an SF and a network entry. The network entry may be classified into an initial network entry, a re-entry and a handover entry.

The aforementioned criteria may be applied for each sub-cell, sector, carrier, BS or ACR.

Distribution for rate control and priority scheduling will be described below.

The distribution for the rate control and the priority scheduling is determined according to a preliminary agreement between an ASN provider and an MVNO service provider. For example, if a total transfer rate is 100 Mbps and if a rate ratio between an MVNO service provider-A and an MVNO service provider-B is 7:3, the transfer rate is distributed so that a rate of up to 70 Mbps is guaranteed for the MVNO service provider-A and a rate of up to 30 Mbps is guaranteed for the MVNO service provider-B. A buffer capacity is also distributed in the same manner as the rate control and priority scheduling is performed using the distributed rate.

The BS distributes and manages resources by considering the aforementioned criteria for each sub-cell. The ACR distributes and manages resources by considering the aforementioned criteria without using an additional sub-unit. In this case, defining an amount of resources distributed to each MVNO in a relative numeric number due to a possibility of changes in an absolute amount of resources, which may be provided in a system, is desired. However, resources may be distributed in a constant ratio with respect to all the aforementioned criteria, and may also be distributed in a separate ratio for each criterion.

An absolute allocation amount based on a determined allocation ratio is determined as follows.

An absolute amount of resources permitted to a $k^{th}$ MVNO is determined according to Equation (1) below.

$$C_k = C \times \gamma_k \quad (1)$$

In Equation (1) above, $C_k$ denotes the absolute amount of resources permitted to the $k^{th}$ MVNO, C denotes a total amount of resources and $\gamma_k$ denotes an allocation ratio of the $k^{th}$ MVNO. Herein, $\gamma_k$ comprises a value greater than 0 and less than 1, and a sum of values $\gamma_k$ for each MVNO is 1.

The total resource amount C indicates different values according to a resource to which the total resource amount is applied. For example, the total resource amount indicates the number of all admissible users when the total resource amount is applied to a user, indicates the number of all admissible SFs when the total resource amount is applied to an SF and indicates a total radio capacity when the total resource amount is applied to a bandwidth-based CAC.

A reference capacity indicator for the distribution criteria is newly defined in an exemplary embodiment of the present invention as expressed by Equation (2) below.

$$D = C \times \delta, \min_k(\gamma_k) \leq \delta \leq 1 \quad (2)$$

In Equation (2) above, D denotes a capacity reference indicator, C denotes the total amount of resources, $\delta$ denotes a setup value for determining the capacity reference indicator and $\min_k(\gamma_k)$ denotes a minimum value among allocation ratios of each MVNO. Herein, $\delta$ is set to a value less than 1.

When the capacity reference indicator is determined according to Equation (2) above, the capacity reference indicator may be expressed by Equation (3) below.

$$\min_k(C_k) \leq D < C \quad (3)$$

In Equation (3), $C_k$ denotes the absolute amount of resources permitted to the $k^{th}$ MVNO, D denotes the capacity reference indicator and C denotes the total amount of resources.

Equation (4) and Equation (5) below express a condition for determining resource allocation by using the capacity reference indicator.

$$\sum^k \sum^i R_{i,k} < D \quad (4)$$

In Equation (4) above, $R_{i,k}$ denotes an absolute amount of an $i^{th}$ resource permitted to the $k^{th}$ MVNO and D denotes the capacity reference indicator.

$$\sum^k \sum^i R_{i,k} \geq D \quad (5)$$

In Equation (5) above, $R_{i,k}$ denotes the absolute amount of the $i^{th}$ resource permitted to the $k^{th}$ MVNO and D denotes the capacity reference indicator.

The conditions described in Equation 4 and Equation 5 above apply to any one of the aforementioned criteria. For example, in the bandwidth-based CAC, the conditions described in Equation 4 and Equation 5 above are utilized as follows. If the condition of Equation 4 above is satisfied, the ASN admits all required QoS SFs. If the condition of Equation 5 above is satisfied, QoS SFs are admitted only when Equation 6 below is satisfied.

$$\sum^i R_{i,k} + R_{new} \leq C_k \quad (6)$$

In Equation (6) above, $R_{i,k}$ denotes the absolute amount of the $i^{th}$ resource permitted to the $k^{th}$ MVNO, $R_{new}$ denotes a requested resource amount and $C_k$ denotes the absolute amount of resources permitted to the $k^{th}$ MVNO.

For example, when the condition of Equation (5) above is satisfied, a sum of requested bandwidths of all QoS SFs is greater than a minimum value of radio capacities of each MVNO, that is, a minimum value of absolute allocation amounts assigned to each MVNO. Thus, if the condition of Equation (6) above is satisfied, that is, if a sum of a bandwidth of previously granted QoS SFs and a bandwidth of newly requested QoS SFs is less than or equal to an absolute amount of a bandwidth permitted to a specific MVNO, the ASN admits the requested QoS SF.

Herein, previously granted QoS SF implies an SF which is in a state where resources are reserved. For example, the previously granted QoS SF includes an SF in an active state where resources are reserved and the resources are actually allocated and also includes an SF in an admitted state in which resources are reserved and the resources are not actually allocated. The previously granted QoS SF does not include an SF in a provisioned state in which resources are not reserved. However, when admission control is based on the number of SFs, all SFs, including the SF in the provisioned state, are taken into consideration.

In performing the CAC as described above, a time duration for reaching to a proportional allocation between MVNOs is determined according to an upper boundary of the value $\delta$. In other words, the more the upper boundary of the value $\delta$ increases, the more the time duration becomes longer. The value $\delta$ may be determined in various manners. For example, the value $\delta$ may be determined as expressed by Equation (7) below.

$$\delta = \max_k(\gamma_k) \quad (7)$$

In Equation (7) above, $\delta$ denotes the setup value for determining the capacity reference indicator, $\gamma_k$ denotes the allocation ratio of the $k^{th}$ MVNO and $\max_k(\gamma_k)$ denotes a maximum value among allocation ratios of each MVNO.

In this case, the capacity reference indicator is expressed by Equation (8) below.

$$\min_k(C_k) \leq D < \max_k(C_k) \quad (8)$$

In Equation (8) above, D denotes the capacity reference indicator, $C_k$ denotes the absolute amount of resources permitted to the $k^{th}$ MVNO, $\min_k(\gamma_k)$ denotes the minimum value among allocation ratios of each MVNO and $\max_k(\gamma_k)$ denotes the maximum value among allocation ratios of each MVNO.

Further, MVNOs may comprise different capacity reference indicators. In this case, each capacity reference indicator is determined according to Equation (9) below.

$$C_k \leq D_k \leq C_k \times \theta_1 + \theta_2 < C, \ \theta_1 \geq 1 \text{ and } \theta_2 \geq 0 \qquad (9)$$

In Equation (9) above, $C_k$ denotes the absolute amount of resources permitted to the $k^{th}$ MVNO, $D_k$ denotes the capacity reference indicator of the $k^{th}$ MVNO and $\theta_n$ denotes a setup value for the capacity reference indicator.

Figure 2:
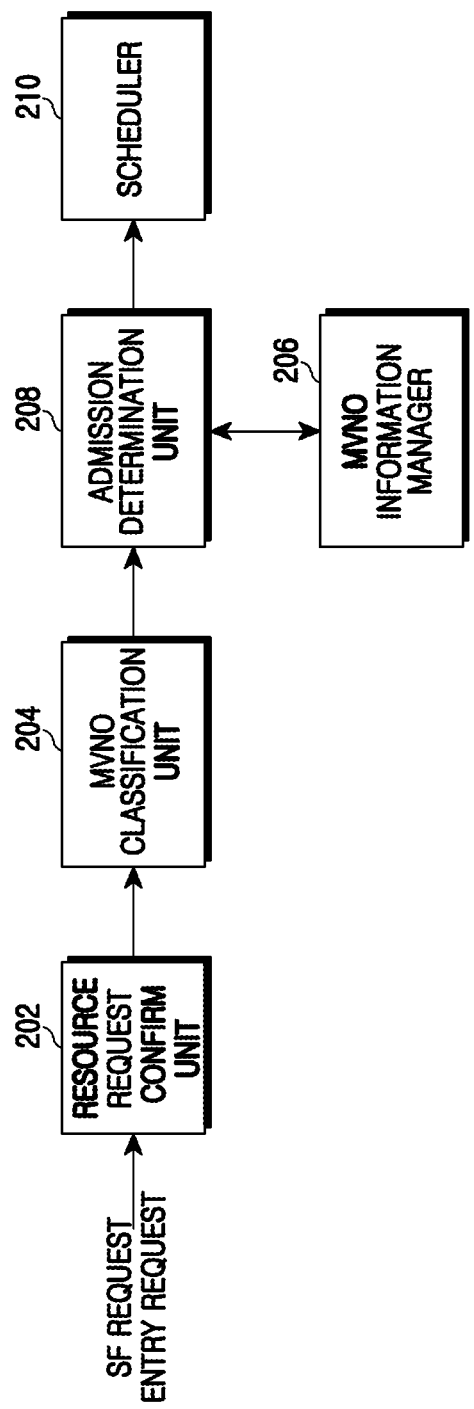
FIG. 2 is a block diagram illustrating an admission control apparatus in a broadband wireless communication system according to an exemplary embodiment of the present invention.

FIG. 2 is a block diagram illustrating an admission control apparatus in a broadband wireless communication system according to an exemplary embodiment of the present invention.

Referring to FIG. 2, the admission control apparatus includes a resource request confirm unit 202, an MVNO classification unit 204, an MVNO information manager 206, an admission determination unit 208 and a scheduler 210.

The resource request confirm unit 202 determines whether a resource of an ASN is requested. Herein, the resource of the ASN indicates at least one of the number of access admitted users, the number of SFs and a bandwidth. Specifically, the resource request confirm unit 202 determines whether a new network entry is requested, whether generation of an SF is requested or whether a bandwidth is requested.

The MVNO classification unit 204 determines an MVNO from a plurality of MVNOs which provides a service for a generated resource request. For example, the MVNO classification unit 204 determines which MVNO provides a service to be provided using the requested resource. A detailed process of determining the MVNO differs depending on a way of representing an MVNO to which an MS belongs. In other words, the MVNO may be determined through various layers such as a Media Access Control (MAC) layer, an Internet Protocol (IP) layer, an application layer, etc., according to exemplary embodiments of the invention. In an exemplary embodiment of the present invention, an assumption is made that the MVNO which provides the service for a generated resource request may be determined by evaluating MVNO identification information based on system design.

The MVNO information manager 206 manages and maintains information on resources of each MVNO. Examples of the information managed and maintained by the MVNO information manager 206 include a resource occupation status of each MVNO, a resource amount permitted to each MVNO and a resource amount which may be additionally permitted to each MVNO. The information on the resource amount permitted to each MVNO comprises a format of a relative ratio of resources permitted to each MVNO. For example, the MVNO information manager 206 manages the relative ratio of resources permitted to each MVNO. In addition, information on resources of each MVNO is managed according to the number of users, the number of SFs and a bandwidth. When the resource request is generated, the MVNO information manager 206 evaluates the resource occupation status of the MVNO determined by the MVNO classification unit 204 and the resource amount permitted to the determined MVNO, and then provides the evaluation result to the admission determination unit 208.

The admission determination unit 208 determines whether to admit the resource request. More specifically, by using at least one of the requested resource amount, the resource occupation status of the determined MVNO, the resource amount permitted to the determined MVNO and an available total resource amount, the admission determination unit 208 determines whether to admit the resource request.

In determining whether to admit the resource request, the capacity reference indicator of Equation (2) or Equation (9) above is used. For example, as shown in Equation (2) above, the capacity reference indicator is set to a value which is commonly used by the MVNO, or as shown in Equation (9) above, the capacity reference indicator is set to a value which is different from one MVNO to another.

If a sum of all admitted resources is less than the capacity reference indicator, the admission determination unit 208 admits the resource request irrespective of the MVNO determined by the MVNO classification unit 204. Specifically, if the condition of Equation (4) above is satisfied, the admission determination unit 208 admits the resource request.

However, if the sum of all admitted resources is greater than or equal to the capacity reference indicator, the admission determination unit 208 determines whether a sum of the resource amount occupied by the determined MVNO and the requested resource amount does not exceed the resource amount permitted to the determined MVNO. If the determination result shows that the sum of the resource amount occupied by the determined MVNO and the requested resource amount does not exceed the resource amount permitted to the determined MVNO, the admission determination unit 208 admits the resource request. Specifically, if the condition of Equation (5) above is satisfied and also the condition of Equation (6) above is satisfied, the admission determination unit 208 admits the resource request.

The scheduler 210 performs scheduling and rate control within a resource range permitted to each MVNO with respect to SFs to which the resource request is admitted. That is, the scheduler 210 divides a transfer rate for each MVNO according to a certain ratio, and performs rate control and scheduling within a range of the divided transfer rate.

The admission control apparatus of FIG. 2 may be included in the BS 13 or the ACR 12 of FIG. 1. Alternatively, the admission control apparatus may be divided in functional block units and the divided functional blocks may be included in the BS 13 or the ACR 12.

If the admission control apparatus is included in the BS 13, in addition to the functional blocks shown in FIG. 2, the BS 13 further includes a communication unit (not shown) which performs communication through a radio channel. The communication unit converts an information bit-stream into complex symbols, maps the complex symbols to subcarriers and converts the complex symbols mapped to the subcarriers into a time-domain signal by performing an Inverse Fast Fourier Transform (IFFT) operation. Further, the communication unit configures an Orthogonal Frequency Division Multiplexing (OFDM) symbol by inserting a Cyclic Prefix (CP) to the time-domain signal. Thereafter, the communication unit up-converts the OFDM symbol into a Radio Frequency (RF) signal and then transmits the RF signal through an antenna.

Figure 3:
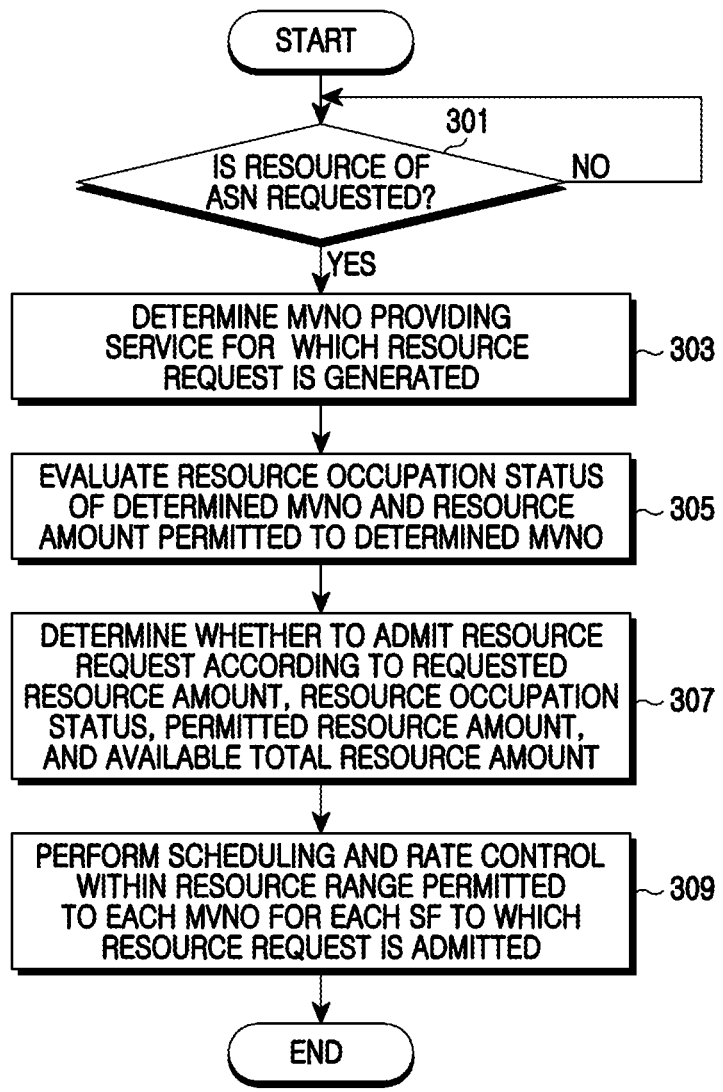
FIG. 3 is a flowchart illustrating an admission control process in a broadband wireless communication system according to an exemplary embodiment of the present invention.

FIG. 3 is a flowchart illustrating an admission control process in a broadband wireless communication system according to an exemplary embodiment of the present invention.

Referring to FIG. 3, in step 301, an admission control apparatus determines whether a resource of an ASN is requested. Herein, the resource of the ASN indicates at least one of the number of access admitted users, the number of SFs and a bandwidth. Specifically, the admission control apparatus determines whether a new network entry is requested, whether generation of an SF is requested or whether a bandwidth is requested.

If the resource is requested, in step 303, the admission control apparatus determines an MVNO which provides a service for a generated resource request. For example, the admission control apparatus determines which MVNO provides a service to be provided using the requested resource. A detailed process of determining the MVNO differs depending on a way of representing an MVNO to which an MS belongs. In other words, the MVNO may be determined through various layers such as a MAC layer, an IP layer, an application layer, etc., according to exemplary embodiments of the present invention. In an exemplary embodiment of the present invention, an assumption is made that the MVNO which provides the service for a generated resource request may be determined by evaluating MVNO identification information based on system design.

After determining the MVNO, in step 305, the admission control apparatus evaluates a resource occupation status of the MVNO determined in step 303 and a resource amount permitted to the determined MVNO. Accordingly, the admission control apparatus manages and maintains information on resources of each MVNO. Examples of the information managed and maintained by the admission control apparatus include a resource occupation status of each MVNO, a resource amount permitted to each MVNO, and a resource amount which may be additionally permitted to each MVNO. The information on the resource amount permitted to each MVNO comprises a format of a relative ratio of resources permitted to each MVNO. For example, the information on the resource amount permitted to each MVNO is managed in the relative ratio of resources permitted to each MVNO. In addition, resource information of each MVNO is managed according to the number of users, the number of SFs and a bandwidth.

In step 307, the admission control apparatus determines whether to admit the resource request. More specifically, by using at least one of the requested resource amount, the resource occupation status of the determined MVNO, the resource amount permitted to the determined MVNO and an available total resource amount, the admission control apparatus determines whether to admit the resource request.

In determining whether to admit the resource request, the capacity reference indicator of Equation (2) or Equation (9) above is used. For example, as shown in Equation (2) above, the capacity reference indicator is set to a value which is commonly used by each MVNO, or as shown in Equation (9) above, the capacity reference indicator is set to a value which is different from one MVNO to another.

If a sum of all admitted resources is less than the capacity reference indicator, the admission control apparatus admits the resource request irrespective of the MVNO determined in step 303. Specifically, if the condition of Equation (4) above is satisfied, the admission control apparatus admits the resource request.

However, if the sum of all admitted resources is greater than or equal to the capacity reference indicator, the admission control apparatus determines whether a sum of the resource amount occupied by the determined MVNO and the requested resource amount does not exceed the resource amount permitted to the determined MVNO. If the determination result shows that the sum of the resource amount occupied by the determined MVNO and the requested resource amount does not exceed the resource amount permitted to the determined MVNO, the admission control apparatus admits the resource request. Specifically, if the condition of Equation (5) above is satisfied and also the condition of Equation (6) above is satisfied, the admission control apparatus admits the resource request.

In step 309, the admission control apparatus performs scheduling and rate control within a resource range permitted to each MVNO with respect to SFs to which the resource request is admitted. For example, the admission control apparatus divides a transfer rate for each MVNO according to a certain ratio, and performs rate control and scheduling within a range of the divided transfer rate.

According to exemplary embodiments of the present invention, resources of a single Access Service Network (ASN) are divided by considering a plurality of service providers in a broadband wireless communication system. Therefore, a plurality of Network Service Providers (NSPs) provide desired services to a single Network Access Provider (NAP). In addition, the ASN performs flexible and optimized Admission Control (AC).

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. An apparatus for Admission Control (AC) in a wireless communication system, the apparatus comprising:
a classification unit for determining a Mobile Virtual Network Operator (MVNO), from a plurality of MVNOs, that provides services for a generated resource request;
a manager for evaluating a resource occupation status of the MVNO and a resource amount permitted to the MVNO; and
a determination unit for determining whether to admit the resource request according to the resource occupation status of the determined MVNO, the resource amount permitted to the determined MVNO and an available total resource amount,
wherein the determination unit determines whether to admit the resource request by using a capacity reference indicator, the capacity reference indicator comprising a multiplication of a total amount of resources and a setup value which is less than 1 and a minimum value among allocation ratios of each MVNO.

2. The apparatus of claim 1, wherein the resource indicates at least one of the number of users, the number of Service Flows (SFs) and a bandwidth.

3. The apparatus of claim 1, wherein the manager manages a relative ratio of resources permitted to each MVNO.

4. The apparatus of claim 3, wherein the determination unit determines whether to admit the resource request by using the capacity reference indicator determined according to:

$$D = C \times \delta, \min_k(\gamma_k) \leq \delta \leq 1,$$

wherein D denotes a capacity reference indicator, C denotes the total amount of resources, δ denotes the setup value for determining the capacity reference indicator, where δ is set to a value less than 1, and $\min_k(\gamma_k)$ denotes the minimum value among allocation ratios of each MVNO.

5. The apparatus of claim 4, wherein, if a sum of all admitted resources is less than the capacity reference indicator, the determination unit admits the resource request irrespective of the determined MVNO.

6. The apparatus of claim 5, wherein the determination unit admits the resource request if the following condition is satisfied:

$$\sum^k \sum^i R_{i,k} < D,$$

wherein $R_{i,k}$ denotes an absolute amount of an $i^{th}$ resource permitted to the $k^{th}$ MVNO and D denotes the capacity reference indicator.

7. The apparatus of claim 4, wherein, if a sum of all admitted resources is greater than or equal to the capacity reference indicator, the determination unit determines whether a sum of a resource amount occupied by the determined MVNO and a requested resource amount does not exceed a resource amount permitted to the determined MVNO, and admits the resource request if the sum of the resource amount occupied by the determined MVNO and the requested resource amount does not exceed the resource amount permitted to the determined MVNO.

8. The apparatus of claim 7, wherein the determination unit admits the resource request if the following conditions are satisfied:

$$\sum^{k}\sum^{i} R_{i,k} \geq D; \text{ and}$$

$$\sum^{i} R_{i,k} + R_{new} \leq C_k,$$

wherein $R_{i,k}$ denotes the absolute amount of the $i^{th}$ resource permitted to the $k^{th}$ MVNO, D denotes the capacity reference indicator, $R_{new}$ denotes a requested resource amount and $C_k$ denotes an absolute amount of resources permitted to the $k^{th}$ MVNO.

9. The apparatus of claim 3, wherein the determination unit determines whether to admit the resource request by using the capacity reference indicator determined according to:

$$C_k \leq D_k \leq C_k \times \theta_1 + \theta_2 < C, \theta_1 \geq 1 \text{ and } \theta_2 \geq 0,$$

wherein the plurality of MVNOs comprises a first MVNO and a second MVNO, $C_k$ denotes an absolute amount of resources permitted to a $k^{th}$ MVNO, $D_k$ denotes a capacity reference indicator of the $k^{th}$ MVNO, $\theta_1$ denotes a setup value for the capacity reference indicator of the first MVNO, and $\theta_2$ denotes a setup value for the capacity reference indicator of the second MVNO.

10. The apparatus of claim 1, further comprising a scheduler for performing scheduling and rate control within a resource range permitted to each MVNO with respect to an SF to which the resource request is admitted.

11. A method for Admission Control (AC) in a wireless communication system, the method comprising:
determining, by a classification unit, a Mobile Virtual Network Operator (MVNO), from a plurality of MVNOs, that provides services for a generated resource request;
evaluating, by a manager, a resource occupation status of the MVNO and a resource amount permitted to the MVNO; and
determining, by a determination unit, whether to admit the resource request according to the resource occupation status of the determined MVNO, the resource amount permitted to the determined MVNO and an available total resource amount,
wherein the determination unit determines whether to admit the resource request by using a capacity reference indicator, the capacity reference indicator comprising a multiplication of a total amount of resources and a setup value which is less than 1 and a minimum value among allocation ratios of each MVNO.

12. The method of claim 11, wherein the resource indicates at least one of the number of users, the number of Service Flows (SFs) and a bandwidth.

13. The method of claim 11, wherein the resource amount permitted to the MVNO is managed in a relative ratio of resources permitted to each MVNO.

14. The method of claim 11, wherein whether to admit the resource request is determined by using the capacity reference indicator determined according to:

$$D = C \times \delta, \min_k(\gamma_k) \leq \delta \leq 1,$$

wherein D denotes the capacity reference indicator, C denotes the total amount of resources, $\delta$ denotes a setup value for determining the capacity reference indicator, where $\delta$ is set to the value less than 1, and $\min_k(\gamma_k)$ denotes the minimum value among allocation ratios of each MVNO.

15. The method of claim 14, wherein the determining of whether to admit the resource request comprises admitting the resource request irrespective of the determined MVNO if a sum of all admitted resources is less than the capacity reference indicator.

16. The method of claim 15, wherein the determining of whether to admit the resource request comprises admitting the resource request if the following condition is satisfied:

$$\sum^{k}\sum^{i} R_{i,k} < D,$$

wherein $R_{i,k}$ denotes an absolute amount of an $i^{th}$ resource permitted to the $k^{th}$ MVNO and D denotes the capacity reference indicator.

17. The method of claim 14, wherein the determining of whether to admit the resource request comprises:
determining whether a sum of a resource amount occupied by the determined MVNO and a requested resource amount does not exceed a resource amount permitted to the determined MVNO if a sum of all admitted resources is greater than or equal to the capacity reference indicator; and
admitting the resource request if the sum of the resource amount occupied by the determined MVNO and the requested resource amount does not exceed the resource amount permitted to the determined MVNO.

18. The method of claim 17, wherein the determining of whether to admit the resource request comprises admitting the resource request if the following conditions are satisfied:

$$\sum^{k}\sum^{i} R_{i,k} \geq D; \text{ and}$$

$$\sum^{i} R_{i,k} + R_{new} \leq C_k,$$

wherein $R_{imk}$ denotes the absolute amount of the $i^{th}$ resource permitted to the $k^{th}$ MVNO, D denotes the capacity reference indicator, $R_{new}$ denotes a requested resource amount and $C_k$ denotes an absolute amount of resources permitted to the $k^{th}$ MVNO.

19. The method of claim 11, wherein the determining of whether to admit the resource request comprises using the capacity reference indicator determined according to:

$$C_k \leq D_k \leq C_k \times \theta_1 + \theta_2 < C, \theta_1 \geq 1 \text{ and } \theta_2 \geq 0,$$

wherein the plurality of MVNOs comprises a first MVNO and a second MVNO, $C_k$ denotes an absolute amount of resources permitted to a $k^{th}$ MVNO, $D_k$ denotes a capacity reference indicator of the $k^{th}$ MVNO, $\theta_1$ denotes a setup value for the capacity reference indicator of the first MVNO, and $\theta_2$ denotes a setup value for the capacity reference indicator of the second MVNO.

20. The method of claim 11, further comprising performing scheduling and rate control within a resource range permitted to each MVNO with respect to an SF to which the resource request is admitted.

* * * * *